United States Patent [19]

Beamer

[11] Patent Number: 4,685,369

[45] Date of Patent: Aug. 11, 1987

[54] PORTABLE MITER DEVICE FOR CHAIN AND HAND SAWS

[76] Inventor: Ralph R. Beamer, 12825 NE. Marine View Dr., Kingston, Wash. 98346

[21] Appl. No.: 852,335

[22] Filed: Apr. 15, 1986

Related U.S. Application Data

[63] Continuation-in-part of Ser. No. 765,858, Aug. 14, 1985, abandoned.

[51] Int. Cl.$^4$ .......................... B27B 21/08; B27G 5/02
[52] U.S. Cl. ........................................ 83/766; 30/372; 83/522; 83/581; 83/823; 83/829; 269/41
[58] Field of Search ................. 83/522, 581, 762, 764, 83/766, 767, 784, 765, 823, 829; 269/41, 295; 30/376, 371, 372

[56] References Cited

U.S. PATENT DOCUMENTS

| | | | |
|---|---|---|---|
| 1,014,674 | 1/1912 | Stevens | 83/767 |
| 1,259,920 | 3/1918 | Simon | 83/767 |
| 2,220,794 | 11/1940 | Pearce | 83/762 |
| 3,741,064 | 6/1973 | Quenot | 83/767 |
| 4,226,152 | 10/1980 | Bies | 83/764 |

Primary Examiner—Frank T. Yost
Assistant Examiner—Hien H. Phan
Attorney, Agent, or Firm—George M. Cole

[57] ABSTRACT

A portable miter guide device for chain and hand saws having a holding assembly (12) including a cradle member (18) and coacting clamps (36,38) for attaching the device to a work piece (W). The device includes a support arm (32) to which is attached an adjustment arm (14) for limited angular movement in a plane parallel to the work piece. Adjustably attached to the outer end of the adjustment arm (14) at an upstanding right angle is a saw guide member (16) with guide slot (80, 88, 90) for guiding chain and hand saws. The device can be attached to large wooden work pieces, the angle of cut chosen and a chain or hand saw (C, H) used to obtain an accurate square or compound cut in the work piece (W). In a second embodiment of the invention the adjustment arm (130) is fixed rather than being pivotal has a disc member (132) with support brackets (136,138) for pivotally supporting guide member (16).

18 Claims, 9 Drawing Figures

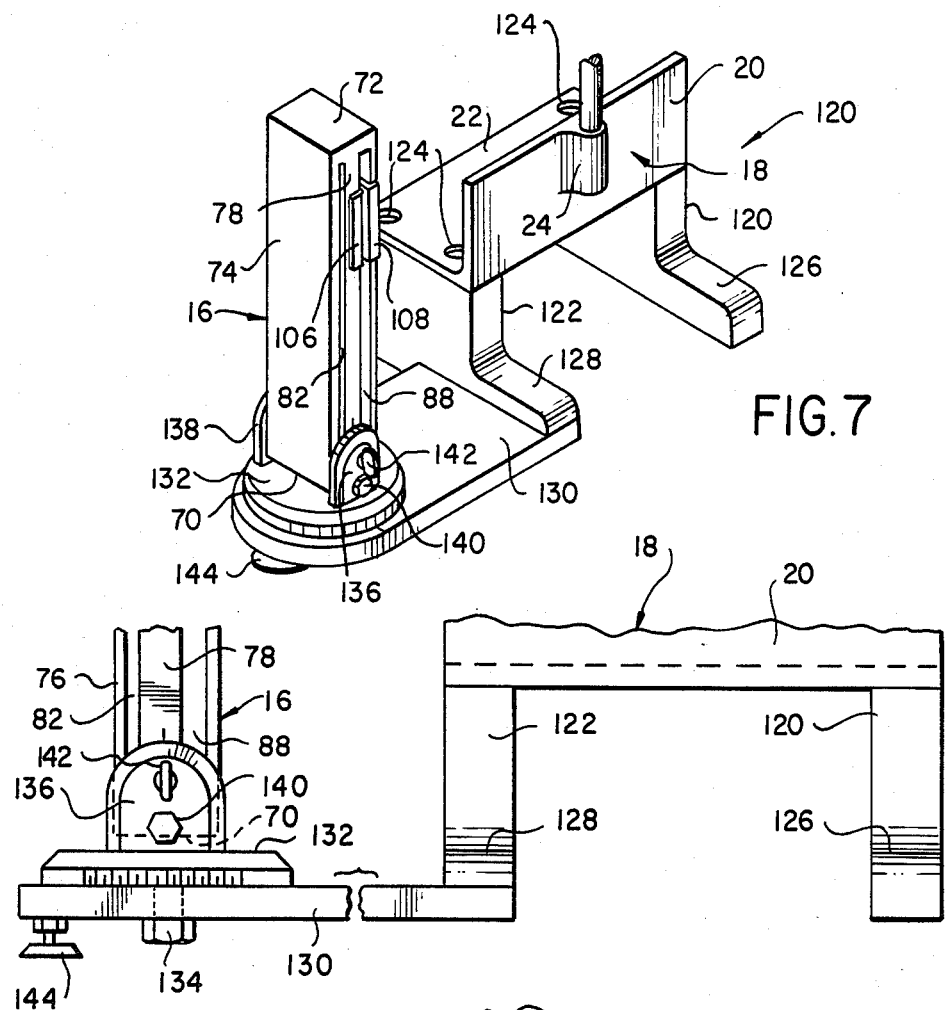
FIG.7
FIG.8
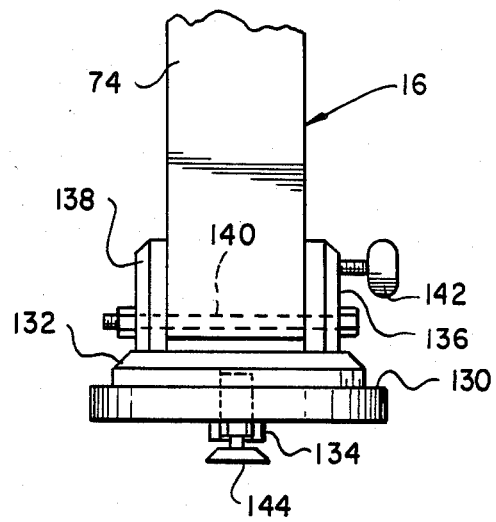
FIG.9

PORTABLE MITER DEVICE FOR CHAIN AND HAND SAWS

This application is a continuation-in-part of U.S. patent application Ser. No. 765,858, filed Aug. 14, 1985 by Ralph R. Beamer for Portable Miter device for chain and hand saws, now abandoned.

Technical Field

This invention relates to the field of miter devices and, more particularly, to a miter device which is portable and particularly adapted for making accurate use of chain saws and hand saws on large wooden structural members which require accurate and/or compound angle cuts.

BACKGROUND ART

As those skilled in the art are aware, it is frequently necessary in the construction industry to precut wooden members at various angles and with a necessary high degree of precision. As an example, in precutting rafters for buildings, it is necessary to prepare such structural members with precise angles depending upon such factors as roof pitch and the type of roof being constructed. Other factors include design variables such as span and whether the roof is of exposed beam design. Skilled tradesmen can operate operate a hand saw so that straight true cuts are made across the width and through the thickness of a piece of material. However, even skilled artisans occasionally make errors in their cuts, particularly if a compound angle cut is required. Also, and even for skilled carpenters, making multiple cuts free hand or with only lines to follow would be difficult to do with accuracy. Thus, timbers or boards are sometimes wasted. Hence, it is desirable to cut in multiples on confirmation of the angle cut. Whether the board or beam is already in place or whether it is to be precut, the cutting line may be particularly hard to follow accurately if the rafter is large such as for example a 10×10 or 8×10 beam or if the rafter is already in place and must be cut from below. It can be extremely awkward for a carpenter working from below to make an accurate cut along the prescribed cutting line.

Numerous guide or miter box devices have been designed to facilitate the angular cutting of wooden members such as rafters and larger wooden structural members. The prior art devices typically include saw guide devices some of which include clamping means for holding the work piece. However, most miter devices are for finish work type angular cuts such as for molding and the like. In the field, a larger wooden structural member may have to be taken to a specially equipped lumber yard in order to have special angles cut on it. No prior art devices are known which are portable and which can accurately guide a hand saw or a chain saw through a stack of rafter members or along a compound angular cut in a timber or beam.

While prior art cevices are generally acceptable in terms of accuracy, they are typically relatively large and expensive and therefore not practical or satisfactory. In cutting rafters, for example, it is desirable to cut each end of the board before removing it from its work supporting surface by utilizing a portable saw guide which can be quickly and accurately attached at each end of the work piece.

Among the prior art patents are U.S. Pat. No. 4,031,794 which is a portable guide but the structure of which is not pertinent to the details of the instant invention. Other devices are shown in U.S. Pat. Nos. 4,325,278; 3,757,628; 2,773,523; 1,541,134; 1,280,203; and 2,705,029. Of the above listed patents, which are the only prior art of which applicant is aware, none are considered to be pertinent to the instant invention as described and claimed.

DISCLOSURE OF INVENTION

The miter device of this invention includes a combination work supporting cradle together with quick adjustment clamping means for attaching the miter to the work piece. Connected to the work supporting and clamping structure is a first angle adjustment arm which may be angularly adjusted within a given range.

At the end of the adjustment arm is an adjustment guide means for setting compound angles with the adjustment if needed. The adjustment guide means includes a hand saw guide as well as a guide for chain saws.

The adjustment arm may be rigidly secured to the cradle member and thus the first angular adjustment means is the guide member rotates on a support disc having a vertical axis of rotation at the other end of the rigid arm. The pivotal guide member continues to rotate through a limited arc on a horizontal axis atop the disc.

Accordingly, it is among the features of the invention that it is portable and relatively light so that it can be attached quickly and conveniently operated by one person. The device enables a single individual to attach the miter to the point at which the cut is to be made. The device fills fills a need which not now satisfied by bridging a gap between existing miters and needs or requirements in the field. Large structural members may otherwise have to be taken to a sawmill or appropriately equipped lumber yard to have special cuts made but this device permits the cuts to be made on site by a single user. The device is inexpensive and accurate. Because it can be conveniently used by a single person it is labor saving so that the miter can be taken to the timber rather than the timber taken to the mill. The device is convenient for making compound angle cuts as well as true square cuts in structural wooden members. The device enables the user to make one true cut from one side rather than having to cut from two sides as is sometimes the case in the field. The device can cut a stack or multiple number of joists or rafters so that all are provided with the same accurate angle cut. The device will cut poles, that is round members, if they are used in the construction. The device is particularly adapted for use by chain saws by the installation of a simple guide means on the saw itself.

BRIEF DESCRIPTION OF THE DRAWINGS

FIG. 7 is a view in perspective of the structure showing a fixed arm with the angular adjustment located at the outer end of the arm;

FIG. 8 is a front elevation view showing additional details of the structure of FIG. 7; and FIG. 9 is an end elevation view showing additional details of the device of FIG. 7.

BEST MODE FOR CARRYING OUT THE INVENTION

Figure 1:
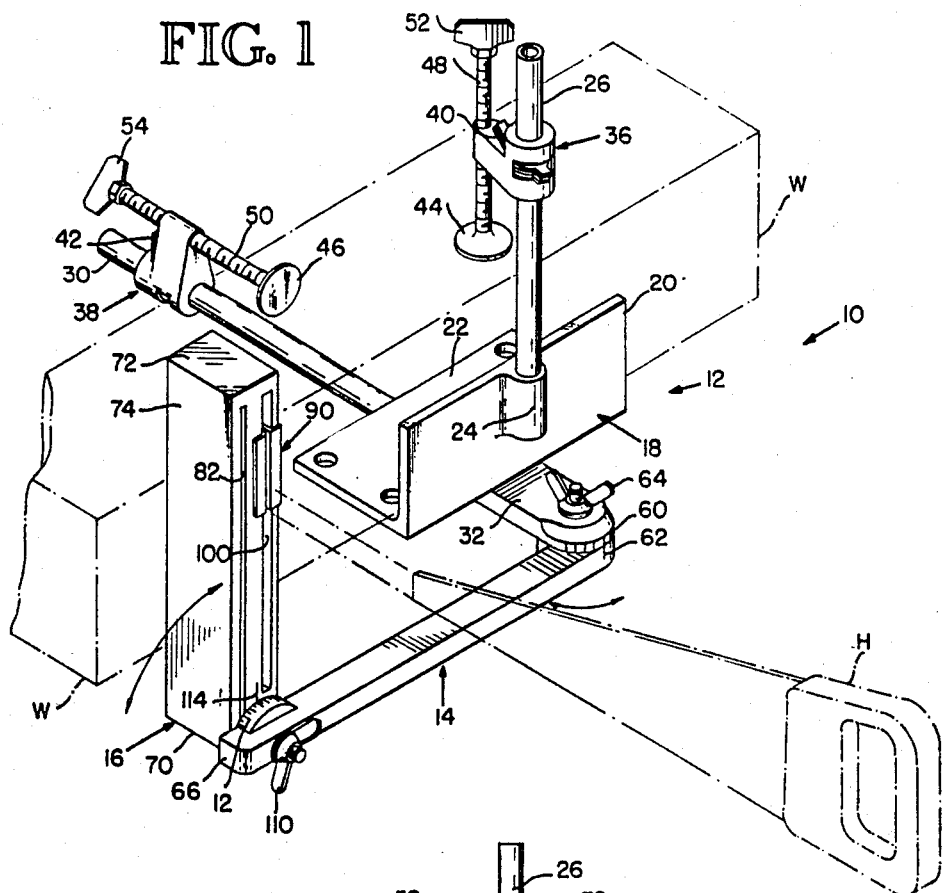
FIG. 1 view in perspective of the structure showing a hand saw in phantom and as it would be guided with respect to the work piece.
Figure 2:
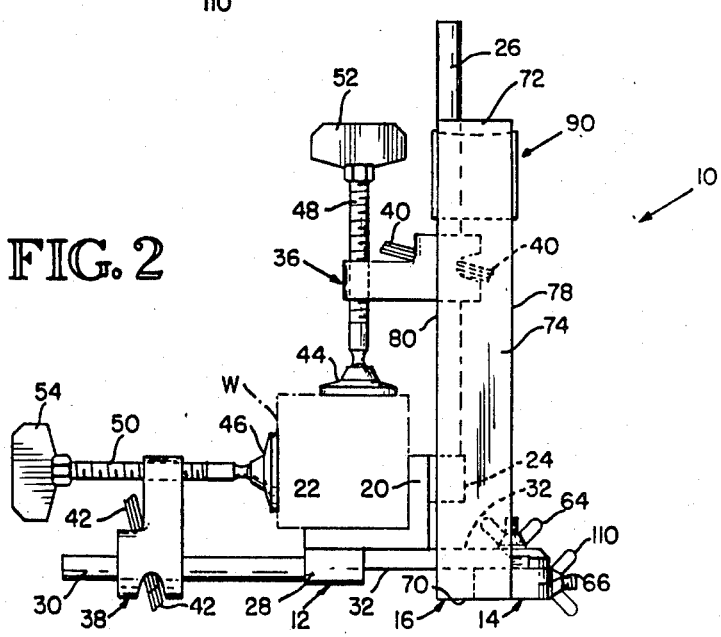
FIG. 2 is an elevational view from the guide piece end showing additional details of construction of the miter device.
Figure 3:
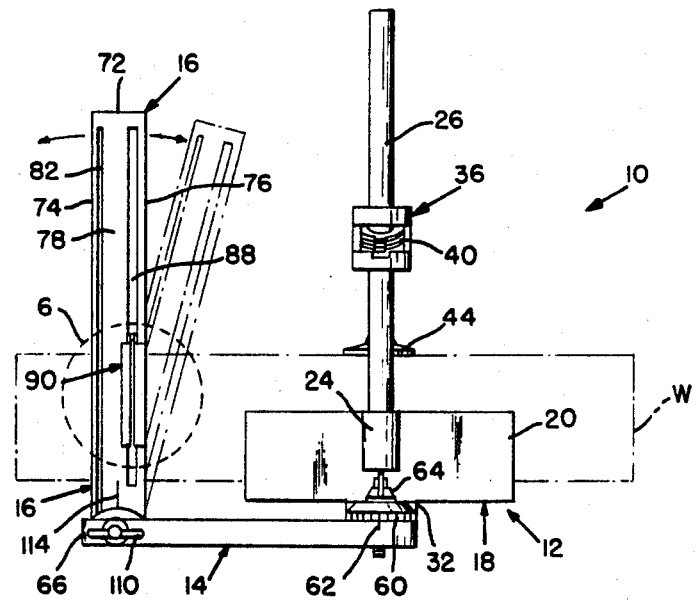
FIG. 3 is a front elevational view of the device showing addition details of construction.
Figure 4:
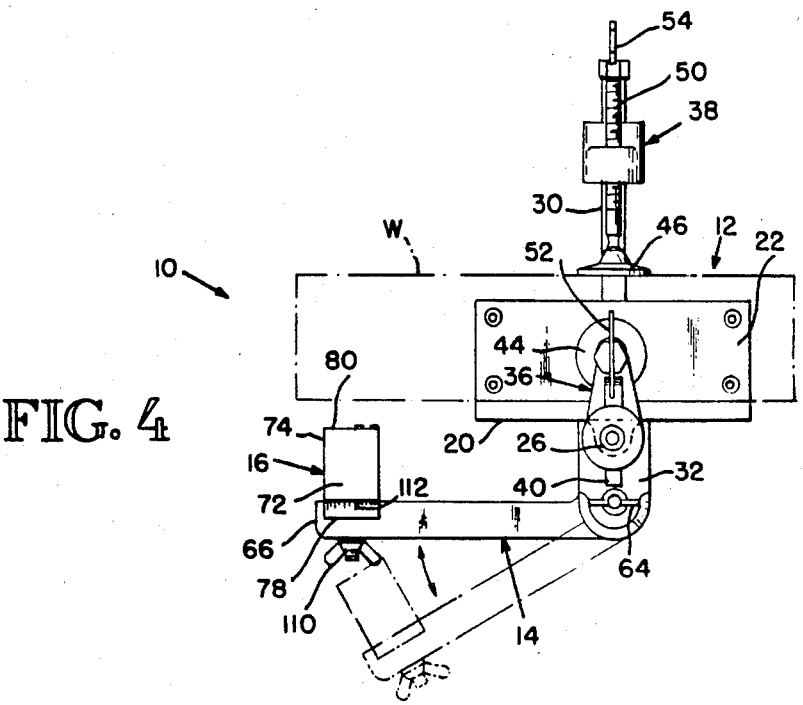
FIG. 4 is a top plan view showing additional details of construction.

Referring now to the drawings, wherein like numbers indicate like parts, the portable miter device 10 includes a work piece clamping structure or assembly generally designated by the number 12, an angular adjustment arm 14 and angularly adjustable guide member 16. The work support assembly 12 includes a right angle cradle member 18 which in the form of a 90 degree angle member having walls or sides 20 and 22. Cradle piece 18 for purposes of illustration is approximately 8 to 10 inches long though this may vary depending on the size of timbers the device is intended to be used on.

On the outside of wall 20 of cradle 18 is threaded socket 24 which receives a length of pipe 26 on which one clamp mechanism slides. Likewise, on the right angle leg 22 of member 18 is threaded socket 28 which receives a length of rod or pipe 30 for receiving a clamp.

Extending outwardly from the outside of wall 20 and which is part of cradle 18 is support arm 32 which as can be seen extends outwardly from side 20 of the cradle for several inches. Attached to clamp rods 26 and 30 are quick release slide clamps 36 and 38 which have finger release binder releases 40 and 42. Upon depression of the binder releases 40 and 42 the clamps 36 and 38 will slide as desired along the clamp rods 26 and 30. The quick release clamps also carry clamp elements or feet 44 and 46 rotatably mounted on threaded rods 48 and 50 which in turn have turning heads 52 and 54. When the clamps 36 and 38 have been moved so that the clamping heads or elements 44 and 46 are close to or in contact with the work piece W final turns can be on the threaded rods so that the work piece W is firmly held in place as is seen in FIGS. 1 to 4. It will be appreciated that the clamp rods 26 and 30 are threadably received in the sockets 24 and 28 so that longer or shorter rods may be substituted to suit the size work pieces to be handled.

The angular adjustment arm 14 is an elongated member approximately 1 foot long mounted pivotally as shown at the outer end of the frame member 32. The outer end of mounting frame member 32 is rounded and provided with indicia 60 which in registration with a line 62 on adjustment arm 14 shows the degree of angle arm 14 bears to work piece W. Thus, in FIG. 4, arm 14 moved to the dashdot position the indicia will indicate its angle of set and the angle which the arm takes with respect to work piece W. A thumb screw 64 is provided for quick release and setting of adjustment arm 14 as desired.

Figure 5:
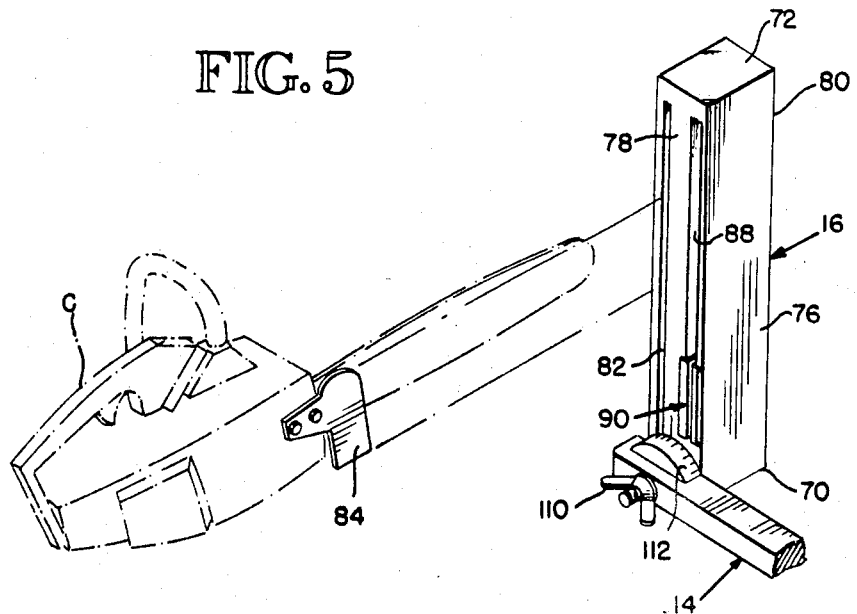
FIG. 5 is a partial view in perspective showing the adapter guide plate on a chain saw for guiding a chain saw in the device.

Near the outer end 66 of arm 14 is pivotally mounted the guide member 16. Member 16 is essentially a rectangular, upstanding frame piece having lower end 70, upper end 72, outer side wall 74, inner side wall 76, front 78 and rear 80. Extending from top to bottom of the guide member 16 is an outside slot 82 extending from near the top 72 to near the bottom end 70 and which slot 82 is dimensioned to receive guide plate 84 attached to chain saw C as best seen in FIG. 5. Guide plate 84 is a rectangular piece which is received in slot 82 and which is easily mounted on the chain saw by bolts which are already a part of the saw.

Figure 6:
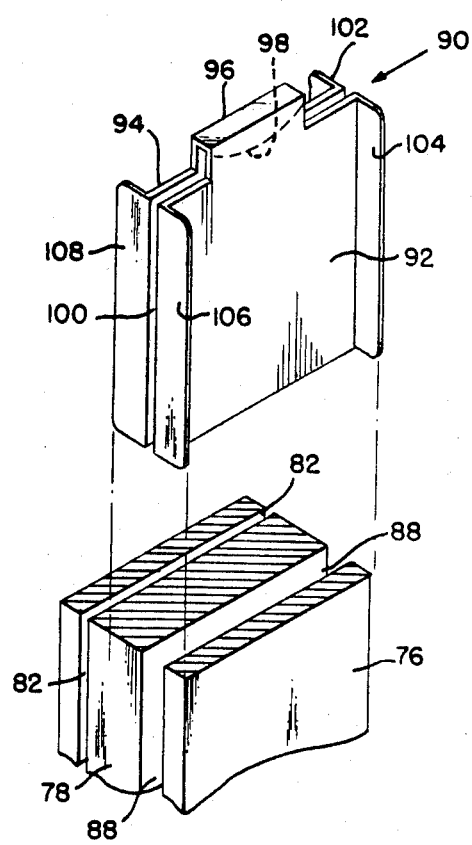
FIG. 6 is a partial view in perspective cross section showing details of the hand saw shuttle mechanism in the guide member.

On the inside edge of the guide member and parallel to slot 82 is a slightly larger slot 88 which receives s shuttle member generally designated by the number 90. Shuttle 90 is generally rectangular and can be seen to have spaced apart guide plates 92 and 94 which define a guide space or groove 100. The plates are joined at the top by connector piece 96 which on the inside thereof is generally rounded as indicated by the number 98 as best seen in FIG. 6. The bottom of shuttle member 90 is open and the plates 92 and 94 are spaced apart just sufficiently to define the groove 100 which accommodates the blade of hand saw H. The shuttle 90 may be made of pot metal or could be made of hard metal with teflon coatings on the inside to minimize wear on the saw blade itself. It will be noted that each outer edge of the two guide plates 92 and 94 are provided with retainer edges 102, 104, 106, and 108. As mentioned above, the shuttle 90 is open at the bottom and slides freely up and down but guides a hand saw in making an accurate predetermined angle of cut on work piece W. It will be appreciated that the bottom of the guide member slots 82 and 88 terminate a prescribed distance above the bottom edge 70 and at least in the case of slot 88 for the hand saw the bottom will be made of pot metal, again to reduce damage to the teeth of the hand saw used. The guide member 16 is pivotally mounted on the end of adjustment arm 14 for a predetermined angular position thereof in the event a compound angle is desired.

The pivot axis of guide member 16 is provided with wing nut 110 so that the angular adjustments can be made. It will be noted that a raised portion on arm 14 includes angle indicia 112 which when aligned with line 114 on face 78 of the guide member indicate the angle to which the guide member is set.

In this way when the work piece W is firmly clamped whether it be to a large timber or a stack of rafters the angle of cut can be set by moving the miter to the cutting line, clamping it firmly and making the cut either with a chain saw or a hand saw.

The embodiment of FIGS. 7 to 9 shows depending support walls 120 and 122 secured to the ends of the underside of leg 22 of cradle 18. The support walls 120 and 122 are detachably secured by machine bolts 124 as best seen in FIG. 7 and include outwardly extending feet 126 and 128 respectively. Wall 122 and foot 128 have attached to the under edge thereof the fixed support arm 130 which is secured by several machine bolts (not shown). The arm 130 for purposes of illustration only is approximately 4 inches wide by 8 inches long by ½ inch thick. Mounted on the top surface thereof at at the outer end which is preferably rounded is a round rotatable disc 132 which rotates about lock bolt 134 extending upwardly through arm 130 and which threads into disc 132.

A pair of upstanding, spaced-apart bracket members 136 and 138 are attached to the top surface of disc 132 as by welding or the like. Guide member 16 is pivotally connected between brackets 136 and 138 by bolt 140 received in a hole near the lower end 70. A locking thumb screw 142 is threadably mounted in bracket 136 to engage the guide member 16 to restrain it against undesired pivotal movement between the brackets. Foot pads 144 may be provided if desired to give the miter device 120 appropriate support for storage on a flat surface.

It will be appreciated that angular adjustment about a vertical axis is provided by loosening lock bolt 134 and turning the disc 130 to an angle inscribed as shown and then retightening the bolt. Thus, the one angle is accomplished by the disc rather than by the entire arm. The bolt 140 permits adjustment of the angle at which the guide member 16 is set, again signified by indicia on top of the bracket 136.

I claim:

1. A portable miter guide device for chain and hand saws, comprising:
   (a) a work piece attaching assembly including a holding cradle means and coacting clamping means for holding said device firmly in position on an elongated work piece, said attaching assembly including a support arm means connected to said cradle means,
   (b) an adjustment arm means of predetermined length angularly and adjustably attached by a first end to said support arm means so as to be set at a predetermined angle with respect to said work piece and having a second end, and
   (c) a saw guide member attached to said second end and adjustably supported at right angles to said adjustment arm means for pivotal angular movement, said guide member including first guide means for chain saws and a second guide slot for hand saws, said adjustment arm slot parallel to said first guide slot and saw guide member being adapted together to accurately guide a saw through true and compound cuts.

2. The portable miter guide device according to claim 1 and in which said work piece attaching assembly includes an elongated generally "L" shaped holding cradle means and pair of quick adjustment clamps for holding said device firmly to said work piece.

3. The portable miter guide device according to claim 2 and wherein said support arm means extends outwardly from said cradle means such that said adjustment arm is supported to pivot generally parallel toward and away from said work piece through a predetermined angular range.

4. The portable miter guide device according to claim 3 and wherein said coacting clamping means includes a pair of rod means extending outwardly from said cradle means and having quick release clamp structures thereon for rapid positioning and further including threadably actuated clamping feet for engaging and securely holding said miter guide device with respect to said work piece.

5. The portable meter guide device according to claim 4 and wherein said saw guide member is a generally rectangularly shaped element having a lower end and an upper end and being releasably and pivotally secured near its lower end to said second end of said adjustment arm such that it is adapted to adjustably pivot through a predetermined angular range.

6. The portable miter guide according to claim 5 and wherein said first guide slot is a first elongated closed slot extending from near said upper and lower ends and being adapted to receive a guide plate means coactingly attached to a chain saw.

7. The portable miter guide device according to claim 6 and wherein said second guide guide slot is a second closed elongated slot means generally parallel to said first slot and including a shuttle member therein for receiving and holding a hand saw and guiding said hand saw along said second slot.

8. The portable miter guide device according to claim 1 and wherein said support arm means extends outwardly from said cradle means such that said adjustment arm is supported to pivot generally parallel toward and away from said work piece through a predetermined angular range.

9. The portable miter guide device according to claim 1 and wherein said coacting clamping means includes a pair of rod means extending outwardly from said cradle means and having quick release clamp structures thereon for rapid positioning and further including threadably actuated clamping feet for engaging and securely holding said miter guide device with respect to said work piece.

10. The portable miter guide device according to claim 1 and wherein said saw guide member is a generally rectangularly shaped element having a lower end and upper end and being releasably and pivotally secured near its lower end to said second end of said adjustment arm such that it is adapted to adjustably pivot through a predetermined angular range.

11. The portable miter guide device according to claim 10 and wherein said first guide slot is a first elongated closed slot extending from near said upper and lower ends and being adapted to receive a guide plate means coactingly attached to a chain saw.

12. the portable miter guide device according to claim 10 and wherein said second guide slot is a second closed elongated slot means generally parallel to and spaced from said first slot and including a shuttle member therein for receiving and holding a hand saw and guiding said hand saw along said second slot.

13. A portable miter guide device for chain and hand saws, comprising:
   (a) a work piece attaching assembly including a holding cradle means and coacting clamping means for holding said device firmly in position on an elongated work piece,
   (b) an adjustment arm means of predetermined length attached by a first end to said holding cradle means and having a second end,
   (c) a rotatable angularly adjustable disc member mounted on said adjustment arm means generally at said second end thereof and including support bracket means thereon, and
   (d) a saw guide member attached to said support bracket means and adjustably supported at right angles to said adjustment arm means for pivotal angular movement, said guide member including first guide slot for chain saws said and a second guide slot parallel to said first guide slot for hand saws, said rotatable angularly adjustable disc member and saw guide member being adapted together to accurately guide a saw through true and compound cuts.

14. The portable miter guide device according to claim 13 and in which said work piece attaching assembly includes an elongated generally "L" shaped holding cradle means and a pair of quick adjustment clamps for holding said device firmly to said work piece.

15. The portable miter guide device according to claim 13 and wherein said coacting clamping means includes a pair of rod means extending outwardly from said cradle means and having quick release clamp structures thereon for rapid positioning and further including threadably actuated clamping feet for engaging and securely holding said miter guide device with respect to said work piece.

16. The portable miter guide device according to claim 13 and wherein said saw guide member is a generally rectangularly shaped element having a lower end and an upper end and being releasably and pivotally secured near its lower end to said support bracket means on said adjustment arm disc means such that it is adapted to adjustably pivot through a predetermined angular range.

17. The portable miter guide device according to claim 16 and wherein said first guide slot is a first elongated closed slot extending from near said upper and lower ends and being adapted to receive a guide plate means coactingly attached to a chain saw.

18. The portable miter guide device according to claim 16 and wherein said second guide slot is a second closed elongated slot means generally parallel to and spaced from said first slot and including a shuttle member therein for receiving and holding a hand saw and guiding said hand saw along said second slot.

* * * * *